(12) United States Patent
Nakatani

(10) Patent No.: US 6,830,227 B2
(45) Date of Patent: Dec. 14, 2004

(54) EXTENSION DEVICE

(75) Inventor: Kouichiro Nakatani, Tokyo (JP)

(73) Assignee: Nihon Velbon Seiki Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/344,489

(22) PCT Filed: Apr. 24, 2001

(86) PCT No.: PCT/JP01/03494
§ 371 (c)(1),
(2), (4) Date: Feb. 12, 2003

(87) PCT Pub. No.: WO02/065014
PCT Pub. Date: Aug. 22, 2002

(65) Prior Publication Data
US 2004/0026579 A1 Feb. 12, 2004

(30) Foreign Application Priority Data
Feb. 13, 2001 (JP) .......................... 2001-35848

(51) Int. Cl.$^7$ ................................. A47F 5/00
(52) U.S. Cl. .................................. 248/354.3
(58) Field of Search .......................... 248/354.3, 163.1, 248/188.5, 167, 168, 170; 52/160, 343, 901, 138, 120; 403/13, 365, 366, 367, 368, 369

(56) References Cited
U.S. PATENT DOCUMENTS

| | | | | |
|---|---|---|---|---|
| 2,262,939 A | * | 11/1941 | Howard | 248/188.5 |
| 2,873,129 A | * | 2/1959 | Edmundson | 403/352 |
| 3,453,011 A | * | 7/1969 | Meinunger | 403/104 |
| 3,589,757 A | * | 6/1971 | Mooney | 403/105 |
| 4,029,279 A | * | 6/1977 | Nakatani | 248/188.5 |
| 4,174,900 A | * | 11/1979 | Ina | 248/163.1 |
| 4,185,936 A | * | 1/1980 | Takahashi | 403/104 |
| 4,596,484 A | * | 6/1986 | Nakatani | 403/104 |
| 4,761,092 A | * | 8/1988 | Nakatani | 403/104 |
| 5,836,620 A | * | 11/1998 | Wang et al. | 285/7 |
| 6,536,723 B1 | * | 3/2003 | Nakatani | 248/163.1 |
| 6,557,433 B1 | * | 5/2003 | Castellon | 74/492 |

FOREIGN PATENT DOCUMENTS

| | | |
|---|---|---|
| JP | 58-88093 | 6/1983 |
| JP | 5-52500 | 7/1993 |
| JP | 5-94599 | 12/1993 |

* cited by examiner

Primary Examiner—Leslie A. Braun
Assistant Examiner—Kofi Schulterbrandt
(74) Attorney, Agent, or Firm—Darby & Darby

(57) ABSTRACT

A first tubular member (11) of an extension device (1) includes a first tubular body portion (16) provided with protruding portions (17) which are so formed on the inner surface of the first tubular body portion (16) as to protrude therefrom and extend from one axial end to the other end of the first tubular body portion (16). A second tubular member (12) which is capable of moving back and forth along the inner surface of the first tubular member (11) includes a second tubular body portion (27). A rotation prevention portion (28) adapted to come into contact with the protruding portions (17) and thereby prevent rotation of the second tubular member (12) is formed on the outer surface of the second tubular body portion (27) so as to rise therefrom. The extent to which the protruding portions (17) protrudes is nearly the same as the thickness (i.e. the height) of the rotation prevention portion (28).

2 Claims, 4 Drawing Sheets

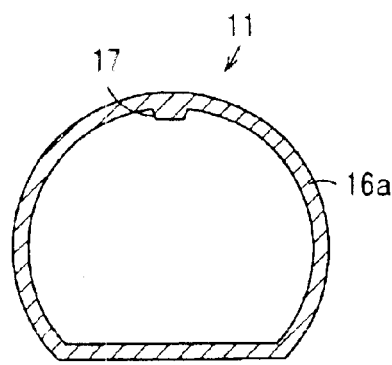
F I G. 4
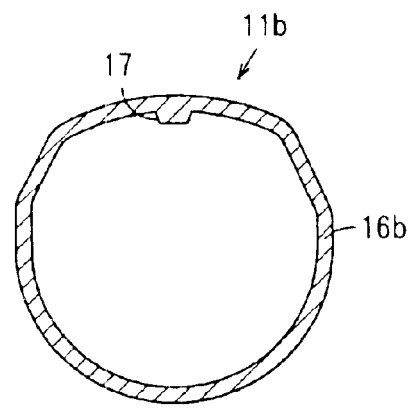
F I G. 5
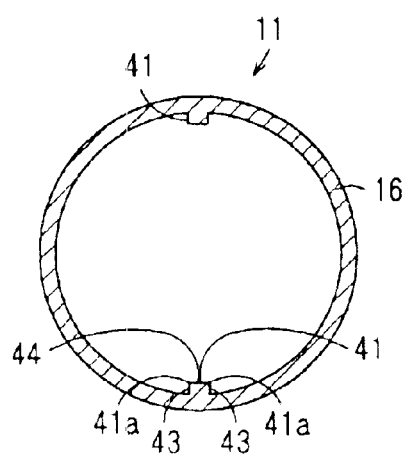
F I G. 6

EXTENSION DEVICE

CROSS REFERENCE TO PREVIOUS APPLICATION

This is a U.S. national phase application under 35 U.S.C. §371 of International Patent Application No. PCT/JP01/03494, filed Apr. 24, 2001, and claims the benefit of Japanese Patent Application No. 2001-35848, filed Feb. 13, 2001. The International Application was published in Japanese on Aug. 22, 2002 as WO 02/065014 A1 under PCT Article 21(2).

TECHNICAL FIELD

The present invention relates to an extension device which is provided with at least a first tubular member and a second tubular member inserted in the said first tubular member in such a way that the length of its projecting portion is adjustable.

BACKGROUND OF THE INVENTION

Examples of conventional extension devices include an extension device 1 shown in FIG. 7, which is used as a leg assembly of a tripod.

The extension device 1 shown in FIG. 7 has a first tubular member 2 and a second tubular member 3 inserted in the first tubular member 2 in such a way that the length of its projecting portion is adjustable.

The first tubular member 2 has a first tubular body portion 6. Grooves 4, 4 having an approximately V-shaped cross section are formed integral with the first tubular body portion 6 by press working, extrusion, or by any other appropriate process. The grooves 4, 4 extend in the axial direction of the first tubular body portion 6 so that the V-shaped cross section protrudes inward. The second tubular member 3 has a second tubular body portion 7. Grooves 5, 5 extending in the axial direction of the second tubular body portion 7 and having an approximately V-shaped cross section protruding inward are formed integral with the second tubular body portion 7 by press working, extrusion, or by any other appropriate process.

The extension device 1 is designed such that engagement of each groove 4 of the first tubular body portion 6 with the corresponding groove 5 of the second tubular body portion 7 prevents rotation of the second tubular member 3 with respect to the first tubular member 2.

However, the conventional extension device 1 shown in FIG. 7 presents a problem in that the wall of the first tubular body portion 6 must have a certain thickness. Otherwise, a relatively great rotational force or other similar stress applied to the second tubular member 3 may deform the first tubular body portion 6, resulting in undesirable rotation of the second tubular member 3 with respect to the first tubular member 2.

In order to solve the above problem, an object of the present invention is to provide an extension device which enables the appropriate prevention of undesirable rotation of the second tubular member 3 with respect to the first tubular member 2.

DISCLOSURE OF THE INVENTION

An extension device according to the present invention includes at least a first tubular member and a second tubular member, which is so inserted inside the first tubular member that the length of its projecting portion is adjustable, wherein the first tubular member includes a first tubular body portion and one or more protruding portions, each of which extends from one axial end to the other axial end of the first tubular body portion in such a way as to protrude inward from the inner surface of the first tubular body portion so that no recess is formed on the outer surface of the first tubular body portion that corresponds to the location of the protruding portion; and the second tubular member includes a second tubular body portion, which is smaller in diameter than the first tubular body portion, and a rotation prevention portion attached to or formed integral with the second tubular body portion, the rotation prevention portion adapted to come into contact with the protruding portion(s) and thereby prevent the second tubular member from rotating circumferentially relative to the first tubular member.

The features of the invention described above permit the first tubular body portion to have a relatively thin wall without the risk of the first tubular body portion being undesirably deformed when a relatively great rotational force or other similar stress is applied to the second tubular member. Another benefit of the present invention lies in its capability of appropriately preventing undesired rotation of the second tubular member relative to the first tubular member.

An extension device according to another feature of the present invention includes at least a first tubular member and a second tubular member, which is so inserted inside the first tubular member that the length of its projecting portion is adjustable, wherein the first tubular member includes a first tubular body portion and one or more protruding portions, each of which extends from one axial end to the other axial end of the first tubular body portion in such a way as to protrude inward from the inner surface of the first tubular body portion so that no recess is formed on the outer surface of the first tubular body portion that corresponds to the location of the protruding portion; and the second tubular member includes a second tubular body portion, which is smaller in diameter than the first tubular body portion, and a rotation prevention portion attached to or formed on the outer surface of the second tubular body portion as an integral body therewith, the rotation prevention portion rising outward from the outer surface of the second tubular body portion and adapted to come into contact with the protruding portion(s), thereby preventing the second tubular member from rotating circumferentially relative to the first tubular member; and the extent to which each protruding portion protrudes is nearly the same as the extent to which the rotation prevention portion rises from the outer surface of the second tubular body portion.

The feature of the invention described above permits the first tubular body portion to have a relatively thin wall without the risk of the first tubular body portion being undesirably deformed when a relatively great rotational force or other similar stress is applied to the second tubular member. Another benefit of the present invention lies in its capability of appropriately preventing undesired rotation of the second tubular member relative to the first tubular member. Furthermore, as the extent to which each protruding portion protrudes is nearly the same as the extent to which the rotation prevention portion rises from the outer surface of the second tubular body portion, the difference in diameter between tubular members that are connected to each other can be reduced compared with cases where the protruding extent of the protruding portions exceeds the thickness (i.e. the height) of the rotation prevention portion.

An extension device according to yet another feature of the present invention is characterized in that the first tubular member is provided with a protruding stopper portion, which extends around nearly the entire inner surface of an axial end of the first tubular body portion except for the portion(s) where the protruding portion(s) are located so as to protrude inward from the inner surface of the first tubular body portion, and that the rotation prevention portion of the second tubular member is adapted to come into contact with the protruding stopper portion so as to function as a stopper for preventing the second tubular member from dropping off the first tubular member.

As the rotation prevention portion of the second tubular member has a function as a stopper, the extension device according to the invention described above is of a simple structure and easier to be assembled, compared with a structure that calls for forming a stopper as a separate body.

An extension device according to yet another feature of the present invention is characterized in that a pair of receiving surfaces are formed along the two axially extending side faces of each protruding portion of the first tubular member and that the rotation prevention portion of the second tubular member includes one-direction rotation preventing contact surfaces and other-direction rotation preventing contact surfaces, each one-direction rotation preventing contact surface adapted to come into surface contact with one of the two receiving surfaces of the corresponding protruding portion, and each other-direction rotation preventing contact surface adapted to come into surface contact with the other receiving surface of the corresponding protruding portion.

Because of surface contact of each one-direction rotation preventing contact surface of the rotation prevention portion with one of the two receiving surfaces of the corresponding protruding portion and surface contact of each other-direction rotation preventing contact surface with the other receiving surface of the corresponding protruding portion, the extension device having this feature of the invention ensures more appropriate prevention of rotation of the second tubular member relative to the first tubular member.

BRIEF DESCRIPTION OF THE DRAWINGS

FIG. 4 is a sectional view of an extension device according to another embodiment of the present invention;

FIG. 5 is a sectional view of an extension device according to yet another embodiment of the present invention;

FIG. 6 is a sectional view of an extension device according to yet another embodiment of the present invention.

PREFERRED EMBODIMENT OF THE INVENTION

Next, an extension device according to an embodiment of the present invention is explained hereunder, referring to relevant drawings.

Figure 1:
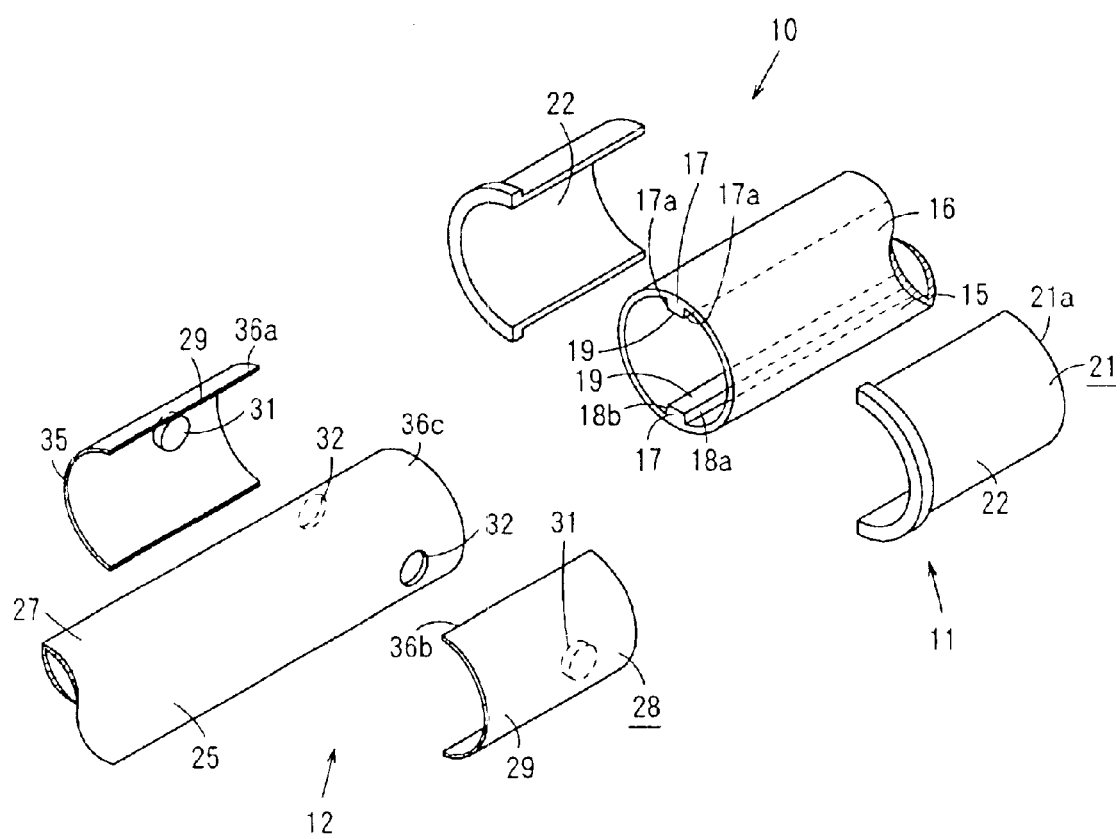
FIG. 1 is an exploded perspective with omissions representing an extension device according to an embodiment of the present invention.

Referring to FIG. 1, numeral 10 denotes an extension device used as a leg assembly of a tripod, a stand unit, a unipod, or the like. The extension device 10 has a plurality of tubular members. In the case of the present embodiment, the extension device 10 includes two tubular members: a first tubular member (upper tube segment) 11 and a second tubular member (lower tube segment) 12, which is so inserted inside the first tubular member 11 that the length of its projecting portion is adjustable.

The extension device 10 includes a locking means (not shown) having a well-known structure so that the second tubular member 12 can be secured in or released from the first tubular member 11 by operating an operating element of the locking means.

Figure 2:
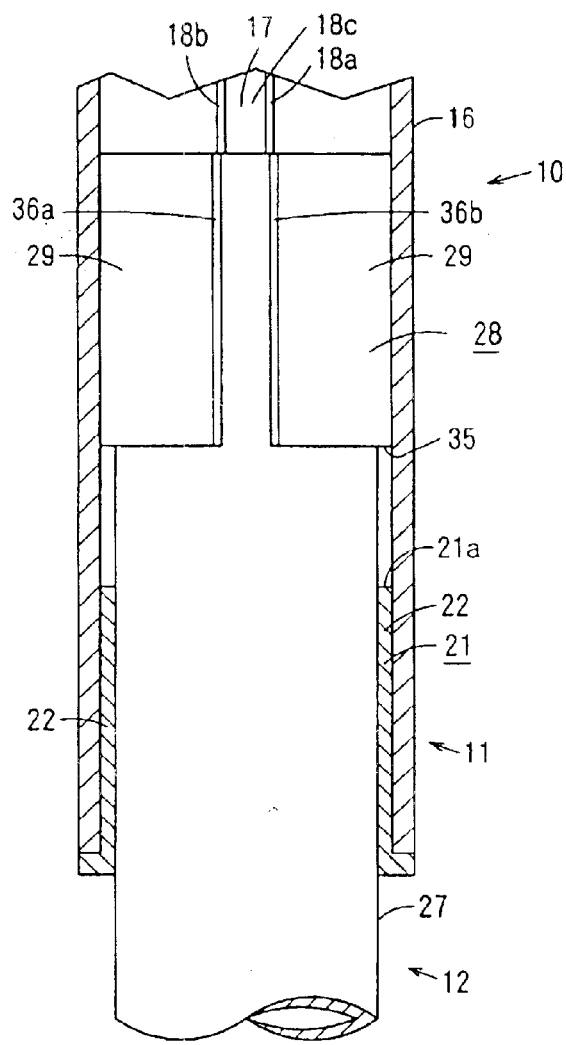
FIG. 2 is a sectional view of said extension device.
Figure 3:
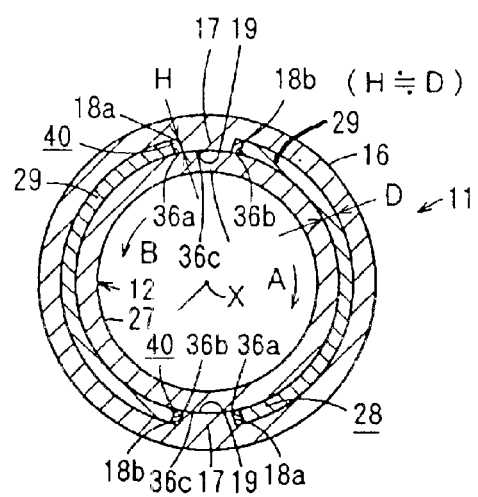
FIG. 3 is a sectional view of said extension device viewed from an axial end thereof.

As shown in FIGS. 1 through 3, the first tubular member 11 has a first tubular body member 16 formed of a long, narrow, thin-walled tubular member 15 having a circular cross section.

Protruding portions 17, 17 that are a plurality of narrow protruding portions (for example, two protruding portions extending parallel to each other) are integrally formed on a part of the inner surface of the first tubular body portion 16. The protruding portions 17, 17 extend in the axial direction of the tubular member and protrude inward from the inner surface of the first tubular body portion 16 so that no recess is formed on the outer surface of the first tubular body portion 16 that corresponds to the locations of the inward protruding portions 17, 17. In other words, the wall of the first tubular member 11 is thicker at the locations where the protruding portions 17 are formed than the other part of the wall.

Each protruding portion 17 extends from one of the axial ends (the upper end) of the first tubular body portion 16 to the other axial end in a continuous straight line so that the protruding portions 17 are spaced apart and oppose each other. Each protruding portion 17 has two corners 17a, 17a so that the protruding portion 17 has a generally trapezoidal cross section.

As shown in FIG. 3, the two side faces extending along the length of each protruding portion 17 are formed into a pair of receiving surfaces 18a, 18b. The receiving surfaces 18a, 18b are connected via a slide-contact surface 19, which is a curved supporting surface adapted to slide on the part corresponding thereto of the outer surface of the second tubular member 12 (the lower segment). Each receiving surface 18a, 18b may constitute a part of, for example, each imaginary plane that includes the center axis X of the first tubular body portion 16, i.e. the line connecting the points that are located at an equal distance from the inner surface of the first tubular body portion 16.

A receiving member 23 having a thin-walled tubular shape is snugly fitted in the lower end of the first tubular body member 16. The receiving member 23 has a cross section having a shape which is similar to but slightly smaller than that of the first tubular body member 16. As shown in FIG. 1, a protrusion 24 for positioning and securing the first tubular body member 16 is formed on the outer surface of the first tubular body member 16.

A protruding stopper portion 21 having a shape comprising two semi-cylindrical halves with a thin wall is provided around nearly the entire inner surface of an axial end (the lowermost portion) of the first tubular body portion 16, except where the protruding portions 17, 17 are located. In the case of the present embodiment, the protruding stopper portion 21 is comprised of a pair of inner curved plate members 22, 22 fixed to the inner surface of the lowermost portion of the first tubular body portion 16. Each inner curved plate members 22 is in the shape of a thin curved plate having an arc-shaped cross section.

As shown in FIGS. 1 through 3, the second tubular member 12 has a second tubular body portion 27, which is formed of a long, narrow, thin-walled tubular member 25 having a circular cross section. The second tubular body portion 27 is smaller in diameter than the first tubular body portion 16, which is formed of the aforementioned tubular member 15, with the second tubular body portion 27 being of similar shape to the first tubular body portion 16.

A rotation prevention portion 28 having a shape comprising two semi-cylindrical halves with a thin wall is provided on a part of the outer surface of the second tubular body portion 27 (for example, the uppermost portion of the second tubular body portion 27). To be more specific, except for the portions that directly face the protruding portions 17, 17, nearly the entire outer surface of the uppermost portion of the second tubular body portion 27 is covered by the rotation prevention portion 28, which is designed to be capable of coming into contact with the protruding portions 17, 17 and thereby preventing the second tubular member 12 from rotating in either circumferential direction (direction A or direction B shown in FIG. 3) relative to the first tubular member 11.

In the case of the present embodiment, the rotation prevention portion 28 is comprised of a pair of outer curved plate members 29, 29, each of which is a stopper member in the shape of a thin curved plate having an arc-shaped cross section and fixed to the outer surface of the uppermost portion of the second tubular body portion 27.

Each outer curved plate member 29 may be formed in a generally rectangular curved plate extending in the axial direction of the second tubular body portion 27. A fixing pin 31 is formed on the inner surface of the each outer curved plate members 29 and protrudes therefrom. The fixing pins 31 are respectively fitted in fixing holes 32, 32 formed in the upper end portion of the second tubular body portion 27. The outer curved plate members 29 are thus fastened to given portions of the tubular member 25, which constitutes the second tubular body portion 27.

As shown in FIG. 3, thickness D of the rotation prevention portion 28, in other words the extent to which the rotation prevention portion 28 extends outward from the cylindrical outer surface of the second tubular body portion 27, is nearly equal to the height H of each protruding portion 17, i.e. the extent to which each protruding portion 17 protrudes inward. The thickness of the protruding stopper portion 21, i.e. the extent to which the protruding stopper portion 21 extends into the first tubular body portion 16, too, is nearly the same as the aforementioned dimension D or H.

When coming into contact with the protruding stopper portion 21, the rotation prevention portion 28 functions as a stopper for preventing the second tubular member 12 from dropping off from the first tubular member 11.

To be more specific, the surface of an end (i.e. the bottom) of the rotation prevention portion 28 functions as a displacement preventing contact surface 35, which is adapted to come into surface contact with one of the end faces (the top end face 21a) of the protruding stopper portion 21 when the second tubular member 12 is adjusted to project to its fullest extent.

The rotation prevention portion 28 also includes one-direction rotation preventing contact surfaces 36a, which are the surfaces of the edges facing the receiving surfaces 18a, i.e. the surfaces facing the direction B, of the aforementioned protruding portions 17, 17. Each one-direction rotation preventing contact surface 36a is adapted to come into surface contact with and thereby removably catch the corresponding receiving surface 18a when force is applied to rotate the second tubular member 12 in the direction A.

The rotation prevention portion 28 also includes other-direction rotation preventing contact surfaces 36b, which are the surfaces of the edges facing the receiving surfaces 18b, i.e. the surfaces facing the direction A, of the protruding portions 17, 17. Each other-direction rotation preventing contact surface 36b is adapted to come into surface contact with and thereby removably catch the corresponding receiving surface 18b when force is applied to rotate the second tubular member 12 in the direction B.

In other words, each outer curved plate member 29 has a displacement preventing contact surface 35 at the lower end face, a one-direction rotation preventing contact surface 36a at the side edge facing the direction B, and a other-direction rotation preventing contact surface 36b at the other side edge, which faces direction A.

The second tubular member 12 includes contact faces 36c along which the second tubular member 12 slides on the aforementioned slide-contact surfaces 19. Each contact face 36c and its adjacent rotation preventing contact surfaces 36a, 36b define a groove 40. The protruding portions 17, 17 of the first tubular member 11 are slidably fitted in the grooves 40 so that the guide function of the protruding portions 17, 17 enables the second tubular member 12 to be extended smoothly from the first tubular member 11.

Next, the function of the embodiment described above is explained hereunder.

For example, when extending the second tubular member 12 to the fullest extent, first of all, the second tubular member 12 is released from the locked state by operating the operating element of the locking means (not shown). subsequently, the second tubular member 12 is extended from the first tubular member 11 until the displacement preventing contact surfaces 35 of the rotation prevention portion 28 come into contact with the top end face 21a of the protruding stopper portion 21. During this extending operation, the protruding portions 17, 17 guide the second tubular member 12 so that the second tubular member 12 can be extended easily and smoothly.

After the extending operation described above, the operating element of the locking means (not shown) is operated to lock the second tubular member 12. Thus, the second tubular member 12 is arranged to project from the first tubular member 11 to the fullest extent.

Should force be applied to the second tubular member 12 to rotate the second tubular member 12 in the direction A when the second tubular member 12 is in the unlocked state, each one of the two one-direction rotation preventing contact surfaces 36a of the rotation prevention portion 28 of the second tubular member 12 comes into surface contact with a part of the receiving surface 18a of the corresponding protruding portion 17, thereby preventing the second tubular member 12 from rotating in the direction A relative to the first tubular member 11.

Should force be applied to the second tubular member 12 to rotate the second tubular member 12 in the direction B when the second tubular member 12 is in the unlocked state, each one of the two other-direction rotation preventing contact surfaces 36b of the rotation prevention portion 28 of the second tubular member 12 comes into surface contact with a part of the receiving surface 18b of the corresponding protruding portion 17, thereby preventing the second tubular member 12 from rotating in the direction B relative to the first tubular member 11.

Figure 7:
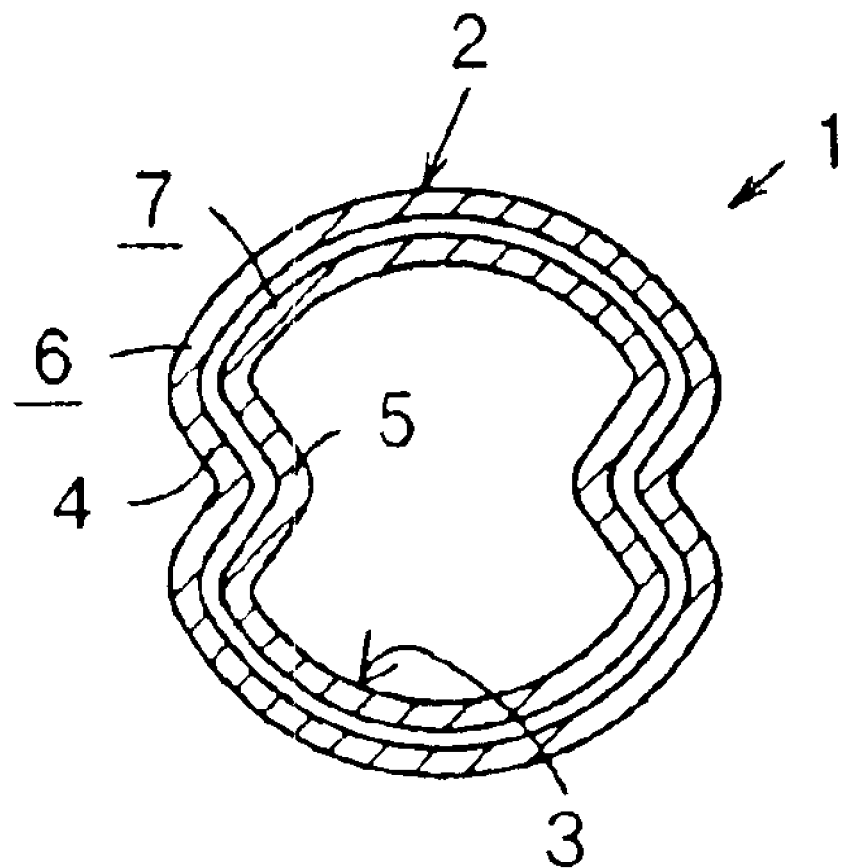
FIG. 7 is a sectional view of a conventional extension device.

Therefore, unlike the conventional extension device 1 shown in FIG. 7, the extension device 10 according to the embodiment described above permits the first tubular body portion 16 of the first tubular member 11 to have a relatively thin wall without the risk of the first tubular body portion 16 being undesirably deformed when a relatively great rotational force or other similar stress is applied to the second tubular member 12. Another benefit of the present embodiment lies in its capability of appropriately preventing undesired rotation of the second tubular member 12 relative to the first tubular member 11.

As there is no need of the wall of the first tubular body portion 16, the second tubular body portion 27, or other component to be thicker than the minimum thickness necessary to achieve required strength and rigidity, the extension device 10 can be made lighter in weight, with less difference in diameter between tubular members that are connected to each other. Furthermore, contact of the rotation prevention portion 28 with the protruding portions 17, 17 ensures reliable prevention of second tubular member 12 from rotating relative to the first tubular member 11.

Neither the first tubular body portion 16 or the second tubular body portion 27 has a groove in the outer surface exposed to the outside. In other words, both body portions have a smooth outer surface, which is appealing in appearance and easy to clean if it becomes dirty.

As dimension H (the extent to which the protruding portions 17 of the first tubular member 11 protrude into the interior of the first tubular body portion 16) is nearly the same as dimension D (the extent to which the rotation prevention portion 28 of the second tubular member 12 rises from the outer surface of the second tubular body portion 27), the difference in diameter between tubular members that are connected to each other can be compared with cases where dimension H of the protruding portions 17 exceeds dimension D of the rotation prevention portion 28. The structure of the embodiment is free from the problem of the presence of the protruding portions 17 increasing the difference in diameter between tubular members that are connected to each other.

Furthermore, the guide function of the protruding portions 17 of the first tubular member 11 permits the second tubular member 12 to be moved smoothly and easily, thereby ensuring the smooth telescopic operation.

The rotation prevention portion 28 of the second tubular member 12 has a function as a stopper. To be more specific, the outer curved plate members 29 have functions both as the rotation prevention portion 28 and a stopper. Therefore, compared with a structure that calls for forming the rotation prevention portion 28 as a separate body from a stopper portion or stopper portions, the extension device according to the embodiment is of a simple structure which is easy to be assembled at reduced production costs.

The extension device 10 according to the embodiment explained as above includes a first tubular member 11 provided with a first tubular body portion 16 having a circular cross section and protruding portions 17 which are formed on the inner surface of the first tubular body portion 16 and adapted to come into contact with the rotation prevention portion 28. However, an extension device provided with a first tubular member 11a shown in FIG. 4 or a first tubular member 11b shown in FIG. 5 can achieve similar effects to those offered by the structure provided with the first tubular member 11; the second tubular member 12 is free from the risk of undesired rotation relative to the first tubular member 11a (or 11b) or biting into the first tubular member 11a (or 11b).

The first tubular member 11a shown in FIG. 4 includes a first tubular body portion 16a with a cross section having a non-standard shape, whose contour is primarily comprised of a curve (an arc) and a straight line. A protruding portion 17 adapted to come into contact with the rotation prevention portion 28 protrudes from the inner surface of the curved portion of the first tubular body portion 16a.

The first tubular member 11b shown in FIG. 5 includes a first tubular body portion 16b with a cross section having a non-standard shape, whose contour is primarily comprised of two curves (arcs) with different curvatures and two straight lines. A protruding portion 17 adapted to come into contact with the rotation prevention portion 28 protrudes from the inner surface of the portion of the first tubular body portion 16b defined by the arc with the smaller curvature. Although no example is shown in the drawings, the first tubular member may be provided with a first tubular body portion with a cross section having any other appropriate shape, such as a polygon, an oval, or the like.

Furthermore, each protruding portion 17 of the first tubular member 11 according to the embodiment described above includes slanted receiving surfaces 18a, 18b and a slide-contact surface 19, which is a curved surface, so that protruding portion 17 has a generally trapezoidal cross section. However, protruding portions having other shapes are also applicable. For example, the first tubular member 11 shown in FIG. 6 has protruding portions 41 that have a square or rectangular cross section.

Each protruding portion 41 shown in FIG. 6 is different from a protruding portion 17 shown in FIG. 3 or other drawings in having a generally rectangular cross section defined by side faces 43, 43, which extend parallel to the diameter of the first tubular body portion 16, and a slide-contact surface 44 in the shape of a flat surface, with the side faces 43, 43 connected to the slide-contact surface 44 via right-angle corners 41a, 41a respectively. The first tubular member 11 provided with the protruding portions 41 shown in FIG. 6 is easier to produce than is any one of the first tubular member 11 shown in FIG. 3 or other drawings. Furthermore, the right-angle corners 41a, 41a bite into the rotation prevention portion 28 and, therefore, reliably prevent undesirable rotation of the second tubular member 12.

The first tubular member 11, 11a, 11b may be provided with various numbers of protruding portions 17, which may have a ridge-like shape; for example, only a single protruding portion 17 or more than two (e.g. three, four, or five) protruding portions 17 may be formed.

The rotation prevention portion 28 may be formed as a separate body from the stopper portion or the stopper portions.

The rotation prevention portion 28 may be formed on the outer surface of the second tubular body portion 27 as an integral body therewith. For example, the rotation prevention portion 28 and the second tubular body portion 27 maybe integrally formed of metal, synthetic resin, or any other appropriate material by using dies. Similarly, it is also permissible to form the protruding stopper portion 21 on the outer surface of the first tubular body portion 16 as an integral body therewith. For example, the first tubular body portion 16 and the protruding stopper portion 21 may be integrally formed of metal, synthetic resin, or any other appropriate material by using dies.

POSSIBLE INDUSTRIAL APPLICATION

As described above, even if the wall of the first tubular body portion is relatively thin, an extension device according to the invention is not prone to deformation and is capable of appropriately preventing undesired rotation of the second tubular member relative to the first tubular member. Therefore, an extension device according to the invention is suitable to be used as, for example, a leg assembly of a tripod.

What is claimed is:

1. An extension device having a projecting portion comprising:
    at least a first tubular member and a second tubular member, which is so inserted inside the first tubular member that the length of the projecting portion is adjustable, wherein:
    the first tubular member includes:
        a first tubular body portion;
        one or more protruding portions, each of which extends from one axial end to the other axial end of the first tubular body portion in such a way as to protrude inward from the inner surface of the first tubular body portion so that no recess is formed on the outer surface of the first tubular body portion that corresponds to the location of the protruding portion;
        a protruding stopper portion, which extends around nearly the entire inner surface of an axial end of the first tubular body portion except for the portion(s)

where said protruding portion(s) are located so as to protrude inward from the inner surface of the first tubular body portion; and a pair of receiving surfaces are formed along the two axially extending side faces of each protruding portion of the first tubular member; and the second tubular member includes:

a second tubular body portion, which is smaller in diameter than the first tubular body portion;

a rotation prevention portion attached to or formed integral with the second tubular body portion, adapted to come into contact with the protruding stopper portion so as to function as a stopper for preventing the second tubular member from dropping off the first tubular member and adapted to come into contact with said protruding portion(s) and thereby prevent the second tubular member from rotating circumferentially relative to the first tubular member, and includes:

one-direction rotation preventing contact surfaces each of which is adapted to come into surface contact with one of the two receiving surfaces of the corresponding protruding portion, and other-direction rotation preventing contact surfaces each of which is adapted to come into surface contact with the other receiving surface of the corresponding protruding portion.

2. An extension device having a projecting portion comprising:

at least a first tubular member and a second tubular member, which is so inserted inside the first tubular member that the length of the projecting portion is adjustable, wherein:

the first tubular member includes:

a first tubular body portion;

one or more protruding portions, each of which extends from one axial end to the other axial end of the first tubular body portion in such a way as to protrude inward from the inner surface of the first tubular body portion so that no recess is formed on the outer surface of the first tubular body portion that corresponds to the location of the protruding portion;

a protruding stopper portion, which extends around nearly the entire inner surface of an axial end of the first tubular body portion except for the portion(s) where said protruding portion(s) are located so as to protrude inward from the inner surface of the first tubular body portion; and a pair of receiving surfaces are formed along the two axially extending side faces of each protruding portion of the first tubular member; and the second tubular member includes:

a second tubular body portion, which is smaller in diameter than the first tubular body portion, and a rotation prevention portion attached to or formed on the outer surface of the second tubular body portion as an integral body therewith so as to rise outward from the outer surface of the second tubular body portion, the rotation prevention portion adapted to come into contact with the protruding stopper portion so as to function as a stopper for preventing the second tubular member from dropping off the first tubular member and adapted to come into contact with said protruding portion(s), thereby preventing the second tubular member from rotating circumferentially relative to the first tubular member; and the extent to which each protruding portion protrudes is nearly the same as the extent to which the rotation prevention portion rises from the outer surface of the second tubular body portion, and the rotation prevention portion includes:

one-direction rotation preventing contact surfaces each of which is adapted to come into surface contact with one of the two receiving surfaces of the corresponding protruding portion, and other-direction rotation preventing contact surfaces each of which is adapted to come into surface contact with the other receiving surface of the corresponding protruding portion.

* * * * *